April 2, 1929. W. H. HAMPTON 1,707,759
PROCESS OF AND APPARATUS FOR TREATMENT OF BITUMINOUS MATERIALS
Filed Dec. 17, 1919 2 Sheets-Sheet 1
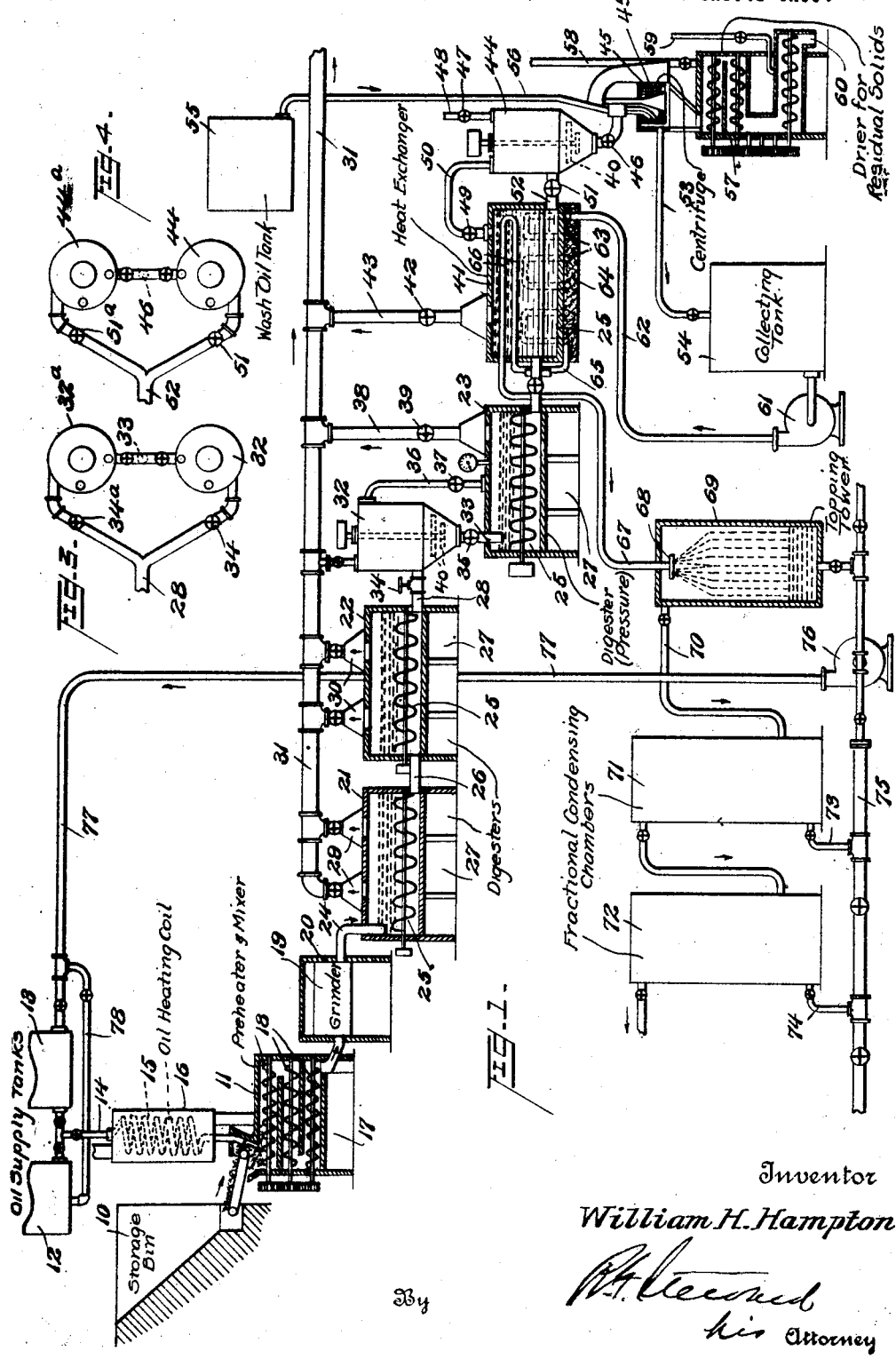
Inventor
William H. Hampton
By
his Attorney April 2, 1929. W. H. HAMPTON 1,707,759
PROCESS OF AND APPARATUS FOR TREATMENT OF BITUMINOUS MATERIALS
Filed Dec. 17, 1919 2 Sheets-Sheet 2
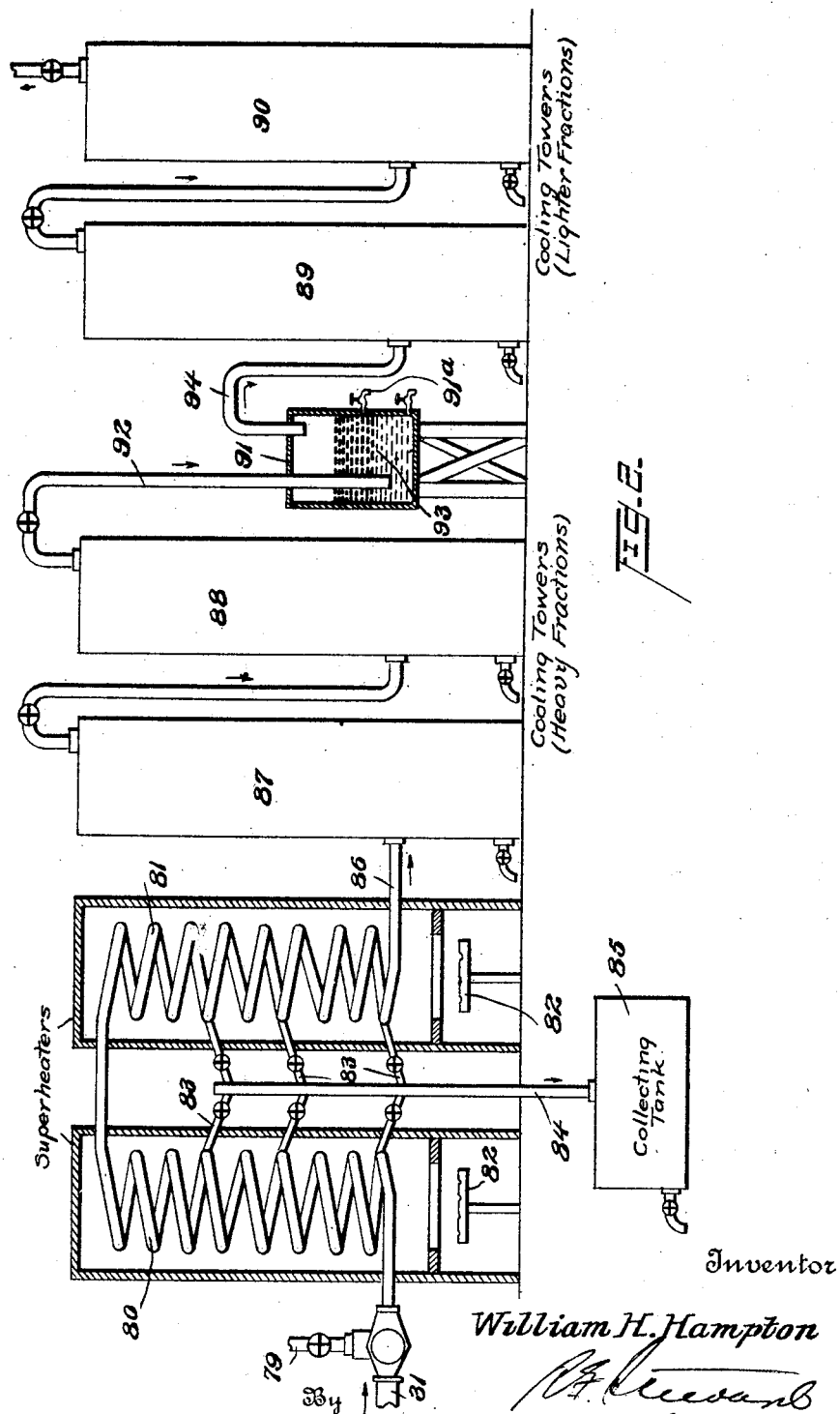

Patented Apr. 2, 1929.

1,707,759

UNITED STATES PATENT OFFICE.

WILLIAM HUNTLEY HAMPTON, OF PORTLAND, OREGON.

PROCESS OF AND APPARATUS FOR TREATMENT OF BITUMINOUS MATERIALS.

Application filed December 17, 1919. Serial No. 345,485.

This invention relates to processes of and apparatus for treatment of bituminous materials. In particular, the invention has to do with the treatment of shale or other bituminiferous solids for the purpose of obtaining valuable hydrocarbons therefrom. Generally described, the process involves digestion of the bituminous material to be treated with a hydrocarbon solvent or digesting medium under pressure, coupled with a simultaneous refining treatment of such hydrocarbon vapors as may be evolved during the digestion; and the residual digestion mixture being then treated for separation of solid material from the accompanying unvaporized oil. A feature of the invention as practiced in one of its advantageous forms is the employment of a digestion solvent which, at ordinary atmospheric pressure, would be wholly or largely vaporized at the digestion temperatures used, but which is to a great extent prevented from so vaporizing by the pressure under which the digestion apparatus is maintained. By employing a hydrocarbon solvent of this character, that is to say, an oil fraction lighter or of higher Baumé than a lubricating fraction, and by employing such relatively light fraction in sufficiently large proportion in mixture with the bituminous material to be treated, the subsequent separation of solid material from the residual digestion mixture may be very much simplified and facilitated, as will hereinafter appear. At the same time, vaporization of lighter fractions during the digestion is not entirely suppressed, and may in fact be encouraged to a certain extent; and the resultant vapors may be led away and subjected to suitable treatment for production of desired fractions, simultaneously with the progress of the digestion. By employing suitable apparatus, the entire series of operations can be effected economically in a continuous manner with the production of practically no free carbon or coky residues such as characterize most ordinary methods for treating materials of the character here in question.

While the invention is not limited in its application to treatment of any specific bituminous material, it finds its greatest present utility in the treatment of shale and other oil-bearing rock or bituminiferous solid materials generally; and for the purpose of fully explaining the underlying principles of the invention, the treatment of bituminous shale will therefore be more particularly referred to. Suitable apparatus of novel character will also be described in connection with the carrying out of the process in practice, although it is to be understood that the process may be practiced in other forms of apparatus than that hereinafter described. Typical novel apparatus suitable for carrying out the process is illustrated in the accompanying drawings in which Figs. 1 and 2 represent, more or less diagrammatically, a complete plant in side elevation, partly in section; and Figs. 3 and 4 are fragmentary plan views of parts of said system.

In the particular embodiment of the novel process here chosen for purposes of illustration, oil-bearing shale, crushed to say one-fourth inch mesh, is fed from a source of supply at 10 into a combined heater and mixer 11, where it is thoroughly mixed with a relatively light mineral oil fraction, such as a kerosene, which is fed to the mixer 11 from one or the other of the tanks 12, 13, through a pipe 14, which has a preheating coil 15 located within an enlargement 16 of a flue leading from the furnace 17 below the combined heater and mixer 11. The mixture of crushed shale and preheated kerosene is advanced by a series of conveyers 18 through the mixer, and is discharged at say from 300° to 400° F. into grinding apparatus, which in this instance comprises a ball mill or tube mill 19, which may be enclosed in brickwork or the like 20 and maintained at the specified temperature by suitable heating means, if necessary. At this temperature it is a comparatively simple matter to reduce the crushed shale to a very finely pulverulent condition, although when cold, it is difficult to pulverize. In practice, the shale should most advantageously be ground at this stage until 60% or more will pass a 200 mesh sieve. The proportion of kerosene or other light fraction may vary considerably, but should be such as to give a readily fluent mixture when the grinding is completed. In practice an addition of kerosene in the proportion of one volume of kerosene to one volume of shale, is found to give satisfactory results. Where the oil fraction employed as a solvent in admixture with the shale is so light as to volatilize considerably at the temperatures employed in the mixer and grinder, suitable condensing means, not shown, may be provided to condense and reflux volatilized portions of said light fraction.

The mixture of finely ground shale and kerosene passes from the grinder to the digestion apparatus which should be of such character as to enable gradually raising the temperature of the mixture to a maximum digestion temperature while advancing the mixture from a point of entry to a point of discharge. Moreover, at least the final stage of the digestion should be conducted under pressure, this being especially necessary where the hydrocarbon solvent is a light fraction such as kerosene which would very largely distil off at the maximum temperature of digestion. In the present example, the digestion apparatus comprises three retorts 21, 22 and 23, only the last of which is maintained under substantial superatmospheric pressure. The warm fluent mixture coming from the grinder 19 enters the first digester 21 through a pipe 24, which dips below the normal surface level of the fluid contents of said digester. The digester is provided with suitable agitating and conveyer means 25 adjacent its bottom, which can be operated at any desired speed to keep the mixture agitated and moving more or less rapidly toward the discharge outlet 26 leading into the next retort in the series. The retort is heated by any suitable furnace means indicated generally at 27, and similar heating means and conveying means are provided in the other two retorts, as shown.

The mixture discharged through outlet 26 into the second retort is similarly advanced therethrough to the discharge outlet 28 at the opposite end of the retort, its temperature being gradually increased en route. The temperature of the digestion mixture should be so regulated that a suitable proportion of the kerosene or other solvent employed remains in the mixture to ensure its fluidity when the digestion is terminated. Vapors incidentally given off in these first two retorts are led away through offtakes 29 and 30 into main vapor pipe 31. During the digestion, steam or an inert gas may be introduced into the digestion mixture or made to sweep over the surface thereof, thereby facilitating vaporization of certain fractions which otherwise would not readily pass off at the digestion temperatures.

Since the third digestion retort is maintained under pressure, while the first two are substantially at atmospheric pressure, it is necessary to provide special means for passing the partially digested mixture from retort 22 into the pressure retort 23. This may be effected by various means; but in the present example a device in the nature of a lock is employed, comprising a closed vessel 32, into which the discharge outlet 28 leads, and from which material may be discharged into the retort 23 through a conduit 33. The pipes 28 and 33 are provided with shut-off valves 34 and 35. An equalizing connection 36, valved at 37, is also provided between the upper part of vessel 32 and the vapor space of retort 23. A vapor outlet 38, valved at 39, is provided for use whenever accumulation of vapors in vessel 32 necessitates exhausting them into the vapor line 31 or elsewhere. By closing valves 35 and 37, and opening valve 34 (also opening valve 39 if necessary) the partially digested mixture may be discharged through 28 into the lock vessel 32, which will fill to the level of the mixture in retort 22. By then closing valve 34, and valve 39 (if open), and opening valves 35 and 37, the mixture previously admitted into 32 will flow gravitally into the pressure retort 23. Stirring means 40, driven in any suitable manner, may be provided within the vessel 32 to facilitate discharge of the mixture into the pressure retort. While mixture is being discharged from 32, a duplicate lock vessel 32ª may be filling, the two vessels thus working in alternation and permitting continuous operation.

In the pressure retort 23, the temperature of the digestion mixture is brought up to whatever maximum may be desirable for the particular bituminous material undergoing treatment. In the case assumed, using kerosene as the extraction solvent and digestion medium, a temperature of around 650° to 680° F. is satisfactory in practice; and ordinarily digestion temperatures ranging between 500 and 700 degrees F. have proved suitable. Any suitable degree of pressure may be maintained within the retort by means of the throttle valve 39 in the vapor offtake 38, which connects the vapor space of the retort 23 with the main vapor pipe 31. By adjusting the throttle valve 39, the proper degree of pressure necessary to suppress vaporization in retort 23 to the required extent, may be attained. In practice this pressure need not exceed 100 pounds, and ordinarily the pressure may be much less than this amount.

The duration of the digestion treatment may vary in accordance with the materials undergoing treatment and the character of the products it is desired to obtain therefrom. Ordinarily the control of the time factor may be achieved most conveniently by varying the speed of the conveyers 25 and thus varying the rate at which the mixture of shale or the like and the solvent medium is caused to progress through the digestion zone. In any event, the digestion should be continued for a sufficiently long period of time to liquefy most of the valuable bitumens contained in the shale or other material being treated; and in any given instance an examination of the undissolved solid matter remaining in the mixture after digestion will determine whether or not the digestion has been carried far enough. In the course of this somewhat prolonged digestion, not only are valuable bitumens dissolved from the solid material, but the liquid portion of the mixture experiences more or less breaking down and rearrangement of the heavy hydrocarbon compounds contained therein, especially in the pressure digester. This breaking down or rearrangement, while perhaps more or less analogous to so-called cracking in certain respects, nevertheless differs substantially from what is commonly known as cracking, in that the transformations or conversions undergone are apparently in the nature of a smooth molecular splitting which does not involve the formation of free carbon or gas to a material extent. By virtue of this fact, no difficulty is experienced from deposits of coke or carbon in the retorts; nor is there the high loss in fixed gas characterizing what are commonly termed cracking processes. Nevertheless the kerosene, or other fraction heavier than gasoline, employed as the digestion solvent or medium, as well as bituminous matter extracted from the shale or other solid during the digestion, apparently undergoes the aforesaid splitting or cleaving reactions to a considerable extent, with the resultant production of lighter products of the nature of gasoline contained in the digestion vapors, all of which are suitably led off, into the main vapor pipe 31, for example, for further treatment to be hereinafter described. Where kerosene is the digestion medium, the digestion vapors also contain more or less unchanged kerosene, depending upon the temperature and duration of the digestion, such volatilized kerosene consisting partly of that originally added and partly of that derived from the shale. But, as before stated, the vaporization should be carefully regulated in order that it may not become excessive, and in order that the final digestion mixture may be of the proper degree of fluidity.

After the digestion is complete, it is necessary to separate residual solid matter from the accompanying unvaporized oil consisting of oil of digestion and oils, waxes, etc., including lubricating fractions derived from the bituminous material, and this may be effected in various ways. Whatever method of separation be employed, it is advisable first to cool down the digestion mixture considerably before making the separation. To this end, the digestion mixture is discharged from the pressure retort 23 into a suitable cooler or heat exchanger 41. Said heat exchanger should also be maintained under pressure in order to prevent undue vaporization of lighter fractions from the hot mixture which it receives. This pressure may be maintained substantially the same as in the pressure retort by proper adjustment of valve 42 in the vapor pipe 43 with which the cooler 41 is provided and which may lead into the main vapor pipe 31. Within this heat exchanger, the digestion mixture is made to give up a large part of its heat to considerably cooler oil derived from a later stage of the process, as will be explained presently.

In the present instance separation of the solid matter from the residual digestion mixture is effected centrifugally, and most desirably by centrifugal filtration; and the conditions of operation are so regulated and controlled that this centrifugal separation may be carried out without thinning down or diluting the digestion mixture with kerosene or other light mineral oil fraction. Accordingly, if the digestion has been properly conducted, the digestion mixture still contains such a large proportion of kerosene that even when it is cooled down to say 100 to 200° F., which is a suitable temperature for the centrifugal separation, it is still sufficiently fluid to enable satisfactory separation without dilution. Since the cooler or heat exchanger 41 is maintained under pressure, as described, and since it is most convenient to effect the centrifugal separation at ordinary atmospheric pressure, it is necessary to provide a lock system or the like, 44, 44$^a$, similar to 32, 32$^a$, for transferring the cooled digestion mixture from the heat exchanger to the centrifugal separator or filtering device 45. By closing discharge valve 46 (and also valve 47 in vapor outlet 48, if open), and opening valve 49 in equalizing pipe 50, and discharge valve 51, digestion mixture moved into the discharge outlet 52 by the conveyer 25 in the heat exchanger, may be discharged into vessel 44 of the lock system, which will fill to the level of the liquid in the heat exchanger 41. By now closing valves 49 and 51, and opening valve 46, the mixture in 44 may be gravitally discharged to the centrifugal, solid matter being caught on the rotating screen or basket 45$^a$ thereof, and separated oil passing through pipe 53 to a receiving tank 54. The two passages 44 and 44$^a$ of the "locking-out" system are of course operated in alternation in a manner similar to the "locking-in" system 32, 32$^a$, so that continuous operation is possible. Solids retained on the centrifugal screen may be washed free of heavy oils, etc., if desired, by warm kerosene or other light solvent supplied from tank 55 through pipe 56, the washings also going to tank 54.

After washing on the centrifugal screen, the retained solids may be dropped into a drier 57 from which kerosene or other vapors may be led off through pipes 58 and 59 for recovery by condensation and returned to supply tank 55, by means not shown. The dried solid matter may be discharged from the drier at 60, and if sufficiently exhausted of valuable bituminous matter, may be discarded; otherwise such solids may be subjected to further treatment for recovery of residual bitumens, in any suitable manner unnecessary to describe here.

The oil collected in the receiving tank 54, which is a mixture of light and heavy fractions, is subjected to suitable fractionation for separation into desired products. This mixture being relatively cool, must be heated to effect fractionation. To this end it is forced by pump 61 through pipe 62 into heat-receiving relation to the hot digestion oil in the heat exchanger or cooler 41. In this instance the relatively cool oil passes from pipe 62 into a series of pipe bends 63 arranged in contact with the outside of the lower part of the digester shell, which may be of sheet metal in accordance with the usual construction of oil retorts or stills. The said lower part of the heat exchanger shell, where not engaged by the coils 63, may be protected by heat insulation 64, if desired. After passing through the bends 63, the cooling oil passes through pipe 65 into bends 66, which are arranged inside the heat exchanger and below the liquid level therein. After passing through bends 63 and 66, the oil mixture is relatively hot, but if not sufficiently hot for fractionating purposes, it may be further heated by means, not shown, to the necessary temperature. In any event, the hot oil is eventually discharged through pipe 67 into a rose 68, by means of which it is sprayed into the upper part of a topping tower 69, in which the lighter fractions are vaporized and pass off through outlet 70 into a series of condensing chambers 71, 72, etc., from which various fractions may be separately drawn off through outlets 73, 74, etc. Assuming that a kerosene fraction is collected in 71, this may be drawn from the common collecting main 75 by pump 76 and sent through pipe 77 to supply tank 13 for example, the valves in said collecting main being of course manipulated to allow the pump to draw exclusively the fraction deposited in chamber 71. In case it may also be desired to employ heavier oil for digestion with the apparatus described, the pump 76 may also be used to draw such heavier oil from the base of the topping tower 69 and force it through pipe 77 and branch 78 to the supply tank 12, the various valves shown in the piping system being adjusted to permit this.

Vapors evolved from the digestion retorts and other parts of the apparatus having vapor pipes connected to the main vapor pipe 31 are subjected to further treatment, as stated, to obtain therefrom desired valuable products. In the present example, the vapors contain both gasoline and kerosene fractions, and it is desired to treat this mixture for production of a larger proportion of gasoline than is initially contained therein. To this end, steam is mixed with the vapors and the combination is then subjected to temperatures substantially higher than those employed in the digestion, in order to effect cracking, the presence of the steam in the mixture serving to prevent extensive formation of free carbon and coky products in the cracking apparatus. Various forms of cracking apparatus may be employed, but in the example here illustrated, the vapors are drawn by steam injector 79 from vapor pipe 31, and the mixture is forced at high velocity through coils of metal piping 80 and 81 heated to a maximum temperature of around 1300 degrees F., or thereabouts, by any suitable firing means such as gas or oil burners 82. Any heavy liquid matter, such as heavy oils or tars collecting in the cracking coils may be trapped off through valved pipes 83 and conveyed through a common down pipe 84 to a receiver 85, to be disposed of in any desired manner. The cracked vapors leave the cracking retort system at 86, and enter a condensing and fractionating system, comprising in this instance two sets of condensing towers or chambers 87, 88, and 89, 90. Although four such chambers are shown, the system may of course comprise as many chambers as may be necessary to produce the fractions desired. The conditions may be adjusted so that heavier fractions such as lubricating oils and heavier kerosenes are obtained in condensers 87, and 88, while lighter fractions, including light kerosenes and gasolines, are obtained in 89 and 90, or in succeeding chambers, not shown. In order to obtain substantially colorless light kerosene and gasoline fractions, without extensive subsequent purification and refining treatment, it has been found desirable in practice to interpose between condensers 88 and 89 a washer 91 into which vapors coming from condenser 88 through pipe 92 are bubbled through water 93 in the washer and are caused to deposit any contained tarry and coloring matter or the like, together with some kerosenes, which may be withdrawn through outlet 91ª; while the cleansed vapors of the kerosene and gasoline fractions pass on through pipe 94 into the succeeding series of condensing chambers.

What I claim is:

1. The process of obtaining valuable hydrocarbon products which comprises mixing with bituminous shale-like solid matter, a mineral oil having a gravity within the kerosene range, digesting the mixture at a temperature high enough to liquefy contained bitumens and under sufficient pressure to substantially retard vaporization of the kerosene and heavier fractions, conducting away and recovering volatilized products, and separating solid matter from the residual digested mixture.

2. The process of obtaining valuable hydrocarbon products which comprises digesting a mixture of a kerosene gravity mineral oil and finely divided bituminous shale-like solid matter at from 500° to 700° F. and under pressure, the pressure employed being high enough to suppress vaporization of the kerosene fraction to such an extent that the solids present in the mixture remaining after digestion are separable centrifugally without dilution, conducting away and recovering volatilized products, and centrifugally separating solid matter from the residual digested mixture.

3. The process of obtaining valuable hydrocarbon products which comprises digesting a mixture of bituminous shale-like solid matter with a hydrocarbon oil under pressure and at temperatures high enough to extract contained bitumens, but not high enough to distill off lubricating or heavier oil fractions to a substantial extent, obtaining valuable products from the digestion vapors, and separating solid matter from the residual fluid digestion mixture.

4. The process of obtaining valuable hydrocarbon products which comprises digesting a mixture of bituminous shale-like solid matter with a hydrocarbon oil having a gravity within the kerosene range at temperatures high enough and for a sufficient length of time to extract contained bitumens and to effect substantial breaking-down or conversion of heavy hydrocarbons into lighter, but avoiding temperatures high enough to produce substantial formation of free carbon or coke, leading off evolved vapors and obtaining valuable products therefrom, and separating solid matter from the residual fluid digestion mixture.

5. The process of obtaining valuable hydrocarbon products, which comprises digesting a mixture of bituminous shale-like solid matter with a hydrocarbon oil first at a pressure not substantially exceeding atmospheric and then under superatmospheric pressure, the temperature being higher in the latter stage and sufficiently high to extract contained bitumens, recovering valuable products from the vapors evolved during digestion, and separating solid matter from the residual fluid digestion mixture.

6. Apparatus for treating bituminiferous materials comprising, in combination, a plurality of digesters, means for advancing material through said digesters successively in series, the last digester in the series being adapted for operation under superatmospheric pressure, a cracking retort connected to said digesters and arranged to receive vapors therefrom, and liquid-separating means connected to the pressure digester and arranged to treat the mixture of solid and liquid material coming therefrom.

In testimony whereof I hereunto affix my signature.

WM. HUNTLEY HAMPTON.